(12) United States Patent
Furuchi (10) Patent No.: US 8,139,385 B2
(45) Date of Patent: Mar. 20, 2012

(54) INVERTER CONTROL CIRCUIT AND CONTROL METHOD THEREOF

(75) Inventor: Masaki Furuchi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 754 days.

(21) Appl. No.: 12/285,716

(22) Filed: Oct. 14, 2008

(65) Prior Publication Data

US 2009/0097287 A1 Apr. 16, 2009

(30) Foreign Application Priority Data

Oct. 12, 2007 (JP) .................................. 2007-266244

(51) Int. Cl.
*H02M 7/5387* (2007.01)
(52) U.S. Cl. .......................................... 363/132; 363/41
(58) Field of Classification Search .................. 363/131, 363/132, 41, 95, 97, 98
See application file for complete search history.

(56) References Cited

U.S. PATENT DOCUMENTS 5,663,667 A * 9/1997 Blum et al. .................... 327/134
2005/0243580 A1* 11/2005 Lyle ................................ 363/16

FOREIGN PATENT DOCUMENTS

JP 2000-188548 7/2000

* cited by examiner

*Primary Examiner* — Harry Behm
*Assistant Examiner* — Matthew Grubb
(74) *Attorney, Agent, or Firm* — McGinn IP Law Group, PLLC (57) ABSTRACT

In an inverter control circuit for controlling an inverter circuit, when an analog signal from the inverter circuit is amplified and converted from analog to digital, a timing at which a gain of an amplifier is switched is securely detected, and the gain is switched. An inverter control circuit includes: a timer circuit for generating a PWM signal with which an electric conductive state of a switch device of an inverter circuit is controlled; an amplifier for amplifying and outputting an analog signal generated with a load electric current of the inverter circuit; and a gain control circuit for controlling the switching of the gain of the amplifier in synchronization with an output change timing of the PWM signal.

13 Claims, 7 Drawing Sheets

INVERTER CONTROL CIRCUIT AND CONTROL METHOD THEREOF

BACKGROUND OF THE INVENTION

1. Field of the Invention

The present invention relates to an inverter control circuit and a control method thereof. More particularly, the present invention relates to an inverter control circuit with pulse width modulation (PWM), and a control method thereof.

2. Description of the Related Art

For a wide range of products from home electric appliances such as an air conditioner and a refrigerator, to industrial machines, motor controlling is performed. Particularly, in recent years, effective control for these electric appliances has become increasingly important in order to reduce power consumption.

For example, an air conditioner uses an inverter circuit to perform motor control in order to improve the accuracy of temperature control and reduce power consumption, and is required to achieve an optimum control of the motor. To be more specific, a pulse width modulation (PWM) drive system is widely used in which switch devices constituting an inverter circuit are turned ON/OFF to control power supply to a motor coil. A microcomputer, for example, is used as a control circuit for PWM driving and controls electric current supply to a motor coil by changing a pulse width for turning ON/OFF the switch devices. An A/D converter receives an analog signal (voltage) based on an electric current flowing through the inverter circuit and the motor, and converts the analog signal into digital data. Then, a central processing unit (CPU) controls the pulse width for the PWM driving so as to optimally drive the motor based on the above digital data.

In order to perform precise control based on an analog signal received by an A/D converter, the resolution of the A/D converter is important. Particularly, it is important that the A/D converter can achieve the high resolution irrespective of the level of the amplitude of an analog signal. In this regard, Japanese Patent Application Publication No. 2000-188548 discloses a technique employing an amplifier which amplifies an analog signal to be inputted into an A/D converter. In this technique, the gain of the amplifier is changed according to a control signal from a CPU, so that the A/D converter is enabled to surely achieve high resolution irrespective of the level of the amplitude of the analog signal.

For a data collection device described in Japanese Patent Application Publication No. 2000-188548, the CPU controls the switching of the connection of resistances in a second multiplexer, whereby the gain (the rate of amplification) is changed. However, when the device is designed to perform the switching control by use of the CPU, the CPU needs to execute processing for every switching. Accordingly, if the CPU performs other processing, a load on the CPU is increased, thus deteriorating the performance of the CPU. Further, when the CPU is executing other high-priority processing, waiting time occurs before actual switching, and this makes it difficult to perform switching at an optimum timing. Particularly, recently, reduction of power consumption of air conditioners, refrigerators and the like has been desired, and therefore improvement of efficiency of an inverter control motor has been desired. In such an application, when controlling an inverter, it is important to reduce a processing load of the CPU so as to reduce the deterioration of the performance thereof as much as possible.

SUMMARY OF THE INVENTION

An aspect of an inverter control circuit of the invention is that the inverter control circuit controlling an inverter circuit including a switch device includes a timer circuit for generating a PWM signal for controlling an electric conductive state of the switch device; an amplifier for amplifying, and outputting an analog input signal generated with a load electric current of the inverter circuit; and a gain control circuit for controlling the switching of a gain of the amplifier in synchronization with an output change timing of the PWM signal.

An aspect of a motor control method of the invention is that a control method of controlling an inverter circuit including a switch device includes the steps of: controlling an electric conductive state of the switch device using a PWM signal; inputting, into an amplifier, an analog input signal generated with a load electric current of the inverter circuit; switching a gain of the amplifier in synchronization with an output change timing of the PWM signal; converting a signal amplified by the amplifier into digital data; and controlling a pulse width of the PWM signal based on the digital data.

In accordance with this invention, a gain of an analog signal inputted into the amplifier in synchronization with a PWM output is switched, whereby it becomes possible to perform an inverter control by amplifying the analog signal depending on the amplitude of the inputted analog signal to perform an optimum A/D control.

DETAILED DESCRIPTION OF THE PREFERRED EMBODIMENTS

An inverter control circuit and a control method thereof in accordance with embodiments of the invention are described below with reference to the accompanying drawings.
(Embodiment 1)

Figure 1:
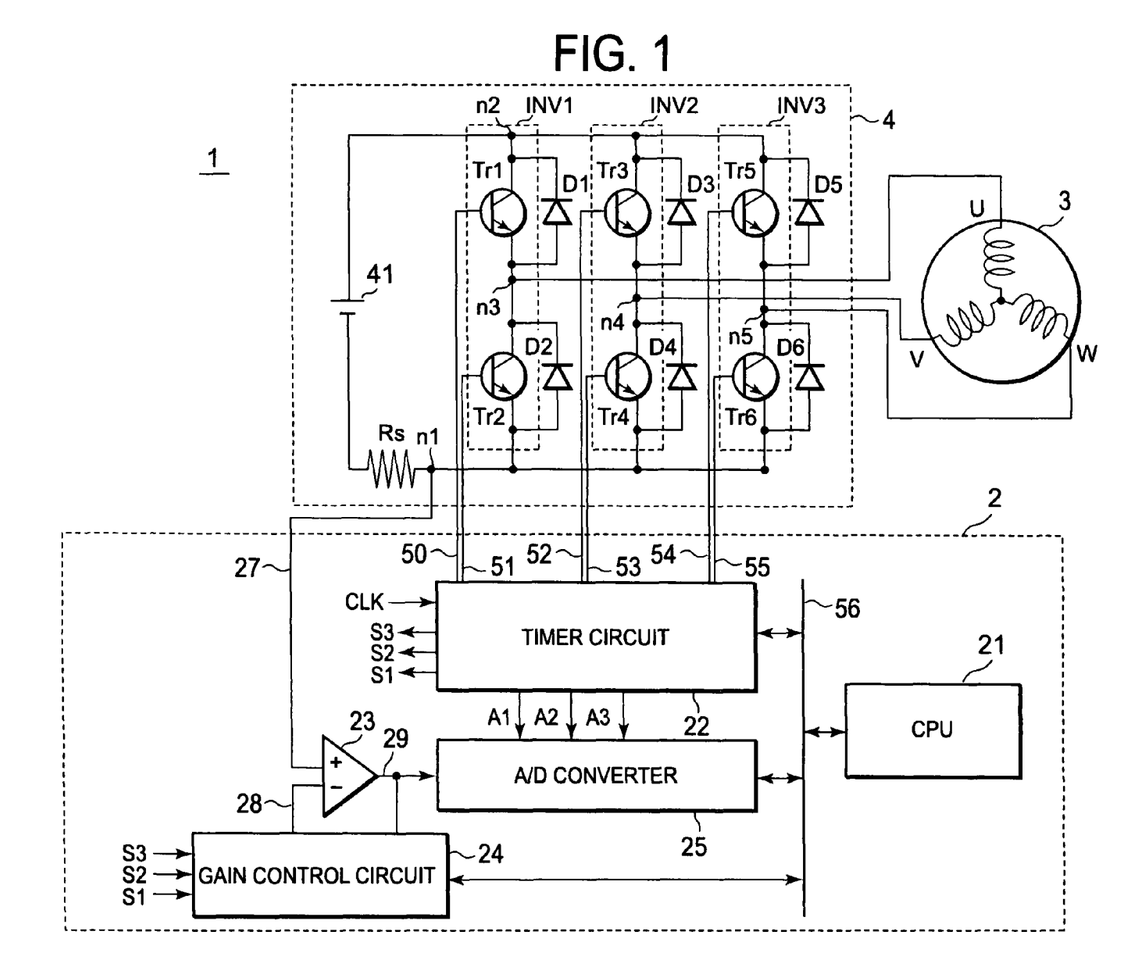
FIG. 1 is a schematic view showing a configuration example of a motor control system on which an inverter control circuit of the invention is mounted.

FIG. 1 is a block diagram showing a configuration example of a motor control system including an inverter control circuit of this embodiment. For a motor, an example in which a 3-phase motor is driven is illustrated. A current flown into a motor coil 3 is controlled by an inverter circuit 4. The inverter circuit 4 includes a plurality of switch devices Tr1 to Tr6, and adjusts a current supplied to a motor by turning ON/OFF the switch devices Tr1 to Tr6, in response to a 6-phase PWM signal inputted from a microcomputer 2. In FIG. 1, for a motor which is a control target, a motor coil 3 is only depicted. In the following description of this embodiment, the motor coil 3 with three coil phases and an inverter INV of the inverter circuit 4 with three phases are described as an example, but the number of phases for coils and that of an inverter of the invention are not limited to those described above for the examples.

The microcomputer 2 outputs, to the inverter circuit 4, a six-phase PWM signal generated by a timer circuit 22. The six-phase PWM signal includes three positive phase signals corresponding to a U-phase, a V-phase, and a W-phase of the motor, and opposite phase signals respectively corresponding thereto. A PWM signal outputted from the timer circuit 22 controls the ON/OFF of the switch devices Tr1 to Tr6. The switch devices Tr1 to Tr6 are provided between a power source 41 and the motor coil 3, and adjusts a current supplied from the power source 21 to the motor coil 3. The inverter circuit 4 outputs, to the microcomputer 2, a voltage of a node n1 which is an end of a resistance Rs referred to as a shunt resistance. The microcomputer 2 monitors the voltage of this node n1, and performs a feedback control for adjusting a pulse width of the PWM signal.

A voltage of the node n1 is inputted to an amplifier 23, on the non-inverting input side, of the microcomputer 2, and amplified, and is converted into digital data by an A/D converter 25 to be measured. An inverting-side input of the amplifier 23 is connected to a gain control circuit 24. A gain of the amplifier 23 is controlled by an output of the gain control circuit 24. Based on data acquired from an A/D conversion result, a CPU 21 performs calculation for adjusting a pulse width of a PWM signal, and thereafter, controls the timer circuit 22.

Incidentally, in this embodiment, as an example, the amplifier 23, the gain control circuit 24, the A/D converter 25, and the timer circuit 22 are all included in the microcomputer 2, and are also connected with each other via a bus 26, and the writing and reading of data necessary for a control are performed by the CPU 21. However, the configuration for the above is not limited to that described above; alternately, part or all of the above may be disposed outside of the microcomputer, except the CPU 21. Further, the A/D converter is described using an example in which the A/D converter has 10-bit resolution for an amplitude ranging from 0 V to a reference power source Vref (e.g., 5 V), but the A/D converter is not limited to this. Alternately, the A/D converter may have both the positive and negative reference power sources, or may have resolution other than 10-bit resolution to be suitably determined by the motor control system.

In Embodiment 1 of the invention, a gain of the amplifier 23 is switched in synchronization with output change timing of three PWM signals outputted from the timer circuit 22 in order to control a plurality of switch devices of the inverter circuit 4. Thus, an analog signal inputted into the amplifier 23 from the inverter circuit 4 is amplified with the gain set by the switching, and an output voltage of the amplifier 23 is converted from analog to digital with the A/D converter 25.

An A/D conversion result is read and then is subjected to the arithmetic processing by the CPU 21, and thereafter, a pulse width of a PWM signal is adjusted. Since a gain of the amplifier 23 is switched in synchronization with output change timing of a PWM signal, it becomes possible to securely detect and amplify a timing at which a voltage to be measured is amplified. The constituent elements and operations thereof are described in detail.

The inverter circuit 4 includes the switch devices Tr1 to Tr6, diodes D1 to D6, the resistance Rs, and the power source 41. The switch devices Tr1 to Tr6, and the diodes D1 to D6 constitute inverters INV1, INV2, and INV3 for three-phase motor drive. Respective inverter outputs are connected to three-phase coils constituting the motor coil 3 so that an electric current is supplied to the motor coil 3. The switch devices Tr1 to Tr6 are represented, for example, by NPN transistors, but are not limited to the NPN transistors.

The switch devices Tr1 and Tr2 constitute the inverter INV1 which is driven and controlled by a PWM signal 50 of U-phase and a PWM signal 51 of opposite phase of U-phase. The switch device Tr1 is constituted of an NPN transistor in which a collector is connected to a node n2, an emitter is connected to a node n3, and the PWM signal 50 is inputted into a base, the signal 50 corresponding to U-phase. The switch device Tr2 is constituted of an NPN transistor in which a collector is connected to the node n3, an emitter is connected to a node n1, and the PWM signal 51 is inputted into a base, the signal 52 corresponding to a signal of opposite phase of U-phase.

Between the node n2 and the node n3, a diode D1 is connected. For the diode D1, an anode is connected to the node n3, and a cathode is connected to the node n2. Similarly, between the node n3 and the node n1, a diode D2 is connected. For the diode D2, an anode is connected to the node n1, and a cathode is connected to the node n3. The diodes D1 and D2 are provided so as to smooth the electric current at the time when fast switching is performed on the switch devices Tr1 and Tr2. Further, when the switch devices Tr1 and Tr2 are switched from ON to OFF, an induced electromotive force is generated in the motor coil, so that a surge voltage (high voltage) is generated in the motor. The diodes D1 and D2 have functions for reducing the surge voltage to be applied to the switch devices Tr1 and Tr2, and for protecting the switch devices Tr1 and Tr2.

In a similar fashion, the switch devices Tr3 and Tr4 constitute the inverter INV2 which is driven by a PWM signal 52 corresponding to a V-phase and a PWM signal 53 corresponding to an opposite phase of the V-phase. The switch device Tr3 is constituted of an NPN transistor in which a collector is connected to the node n2, an emitter is connected to the node n3, and the PWM signal 52 of V-phase is inputted into a base. The switch device Tr4 is constituted of an NPN transistor in which a collector is connected to a node n4, an emitter is connected to the node n1, and the PWM signal 53 of opposite phase of V-phase is inputted into a base. For the diode D3, an anode is connected to the node n4, and a cathode is connected to the node n2. For the diode D4, an anode is connected to the node n1, and a cathode is connected to the node n4.

The switch devices Tr5 and Tr6 constitute the inverter INV3 which is driven by a PWM signal 54 corresponding to a W-phase and a PWM signal 55 corresponding to an opposite phase of the W-phase. The switch device Tr5 is constituted of an NPN transistor in which a collector is connected to the node n2, an emitter is connected to a node n5, and the PWM signal 54 of W-phase is inputted into a base. The switch device Tr6 is constituted of an NPN transistor in which a collector is connected to the node n5, an emitter is connected to the node n1, and the PWM signal 55 of opposite phase of W-phase is inputted into a base. For the diode D5, an anode is connected to the node n5, and a cathode is connected to the node n2. For the diode D6, an anode is connected to the node n1, and a cathode is connected to the node n5.

The nodes n3, n4, and n5 which are outputs of the inverters INV1 to INV3 are respectively connected to three-phase coils constituting the motor coil 3. Electric currents supplied from the nodes n1 to n3 flow in the motor coil 3, so that the rotation of the motor is controlled. A resistance Rs is connected between the node n1 and ground, and a load electric current of the inverter circuit 4 flows via the resistance Rs whereby a voltage of the node n1 is generated and connected to the amplifier 23 in the microcomputer 2.

Figure 2:
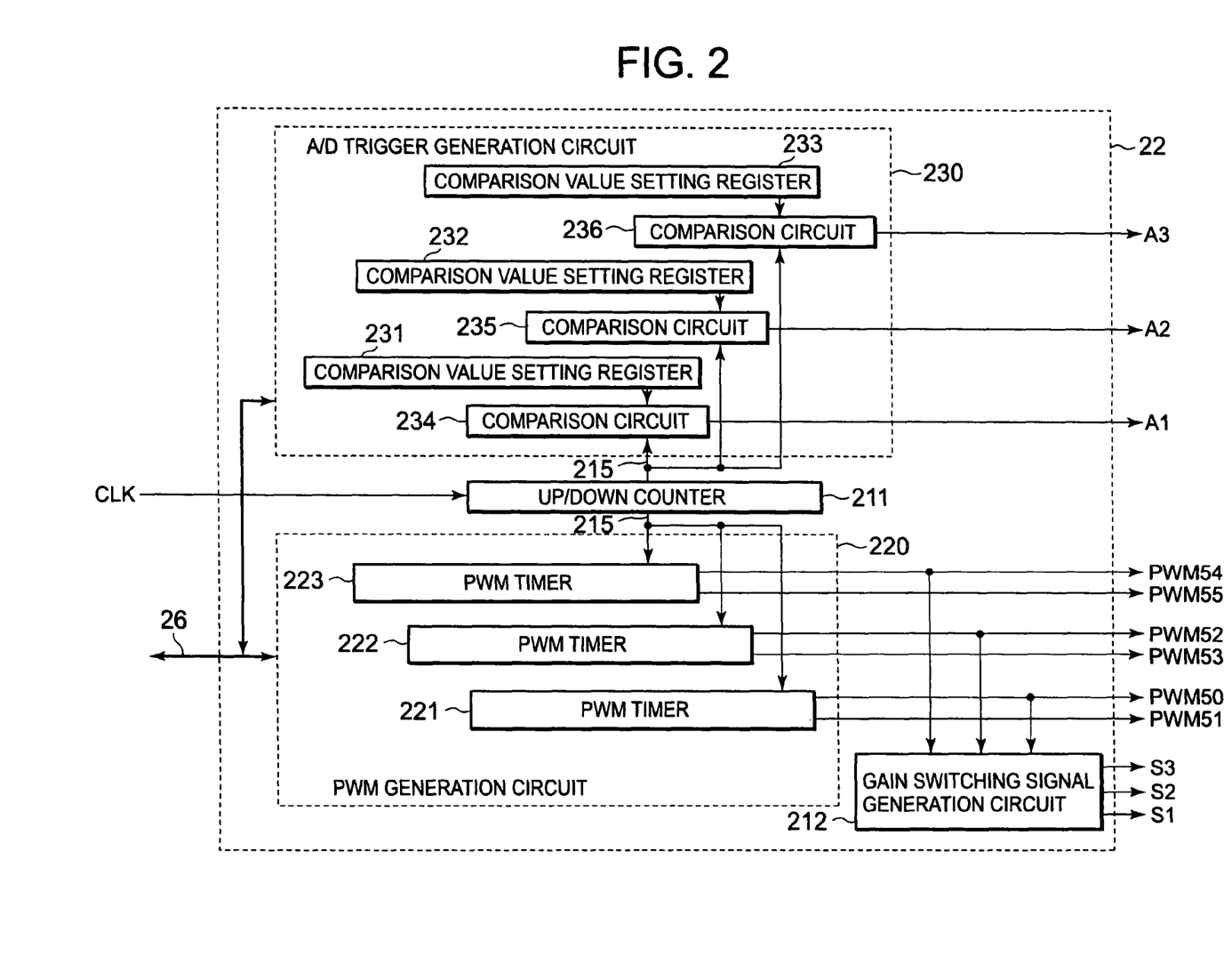
FIG. 2 is a view showing a timer circuit of a first embodiment of the invention.

FIG. 2 shows a configuration of the timer circuit 22. The timer circuit 22 includes an up/down counter 211 which inputs, as a clock CLK for counter, a clock outputted from a clock generation circuit (not shown) of the microcomputer 2; a PWM generation circuit 220 which generates a PWM signal controlling the inverter circuit 4; an A/D trigger generation circuit 230 which generates a trigger signal for the start of an A/D conversion of an A/D converter; and a gain switching signal generation circuit 212 which switches and controls a gain of the amplifier 23.

In accordance with the inputting of a CLK, the up/down counter 211 counts up from a minimum value 0 up to a maximum value M (M being an integer), and after the inputting of a subsequent CLK, the up/down counter 211 counts down to the minimum value 0. Thereafter, in accordance with the inputting of a CLK, operations of the counting up and counting down are repeated.

The PWM generation circuit 220 includes a PWM timer 221 which outputs a PWM signal 50 of U-phase and a PWM signal 51 corresponding to an opposite phase of U-phase; a PWM timer 222 which outputs a PWM signal 52 of V-phase and a PWM signal 53 corresponding to an opposite phase of V-phase; and a PWM timer 223 which outputs a PWM signal 54 of W-phase and a PWM signal 55 corresponding to an opposite phase of W-phase.

Further, in a real inverter control, as for the change timings of the PWM signal 50 and the PWM signal 51, the signals are outputted with a time difference of a period of time generally referred to as dead time. Otherwise, the overlapping of the change timings may cause both the Tr1 and Tr2 of the inverter circuit 4 to be temporarily turned ON. Then, a through current may flow into both the Tr1 and Tr2 simultaneously. To avoid this, the dead time is provided. This is made so as not to cause the overlapping of the change timings to temporarily turn ON both the Tr1 and Tr2 of the inverter circuit 4 which, causes a through current to flow. Similarly, dead time is also provided to the PWM signals 52 and 53, and the PWM signals 54 and 55. In this embodiment of the invention, for the sake of simplifying the following description, the dead time is not taken into consideration.

The PWM timer 221 can be constituted of known circuits, and hence a detailed illustration of the PWM timer 221 is omitted. To the PWM timer 221, a comparison value setting register for setting a pulse width of the PWM signal 50 at a predetermined period is provided, and when a count value output of the up/down counter 211 matches with contents of the comparison value setting register, the output is inverted. Also provided with a register for setting a repetitive period of a pulse, a count value of the up/down counter 211 is compared, and when it becomes a predetermined count value, the output of the PWM signal 50 is newly inverted whereby a period of a PWM output is repeated.

Contents of the comparison value setting register and the register for pulse period setting of the PWM signal 50 are transferred from the CPU 21 via the bus 26. The PWM signal 51 is received as an inversion of the PWM signal 50. In practice, however, the PWM signal 51 is outputted at a timing delayed by the dead time from the change timing of the PWM signal 50, as described above. A timer for dead time setting is provided, and for the dead time, a value to be transferred from the CPU 21 is set. The PWM timers 222 and 223 also have the same configuration, but PWM signals having different pulse widths corresponding to the V-phase and the W-phase are outputted based on the setting by CPU 21.

The A/D trigger generation circuit 230 includes comparison value setting registers 231, 232, and 233 for making comparison with a count value (an output 215) of the up/down counter 211, and comparison circuits 234, 235, and 236 for outputting trigger signals A1, A2, and A3 for the start of an A/D conversion after making comparison with the count value.

An output signal 27 of the amplifier 23 is inputted into the A/D converter 25, and sampling and a conversion into digital data are started based on the trigger signals A1, A2, and A3. In the comparison value setting registers 231, a value is set for generating a timing at which a voltage of the analog signal 27 of the inverter circuit 4 is converted from analog to digital, the voltage changing in accordance with outputs of six PWM signals outputted from the PWM generation circuit 220. Detailed timing is described later.

The gain switching signal generation circuit 212 detects a change of a PWM signal outputted from the PWM generation circuit 220, and generates a pulse for switching of a gain of the amplifier 23. With the PWM signals 50, 52, and 54 being inputted, to the gain control circuit 24, gain switching signals S1, S2, and S3 are outputted. More specifically, a pulse signal S1 of one shot is outputted in synchronization with the rising of the PWM signal 50. Further, in synchronization with the rising of the PWM signal 52, a pulse signal S2 of one shot is outputted, and in synchronization with the rising of the PWM signal 54, a pulse signal S3 of one shot is outputted.

Figure 3:
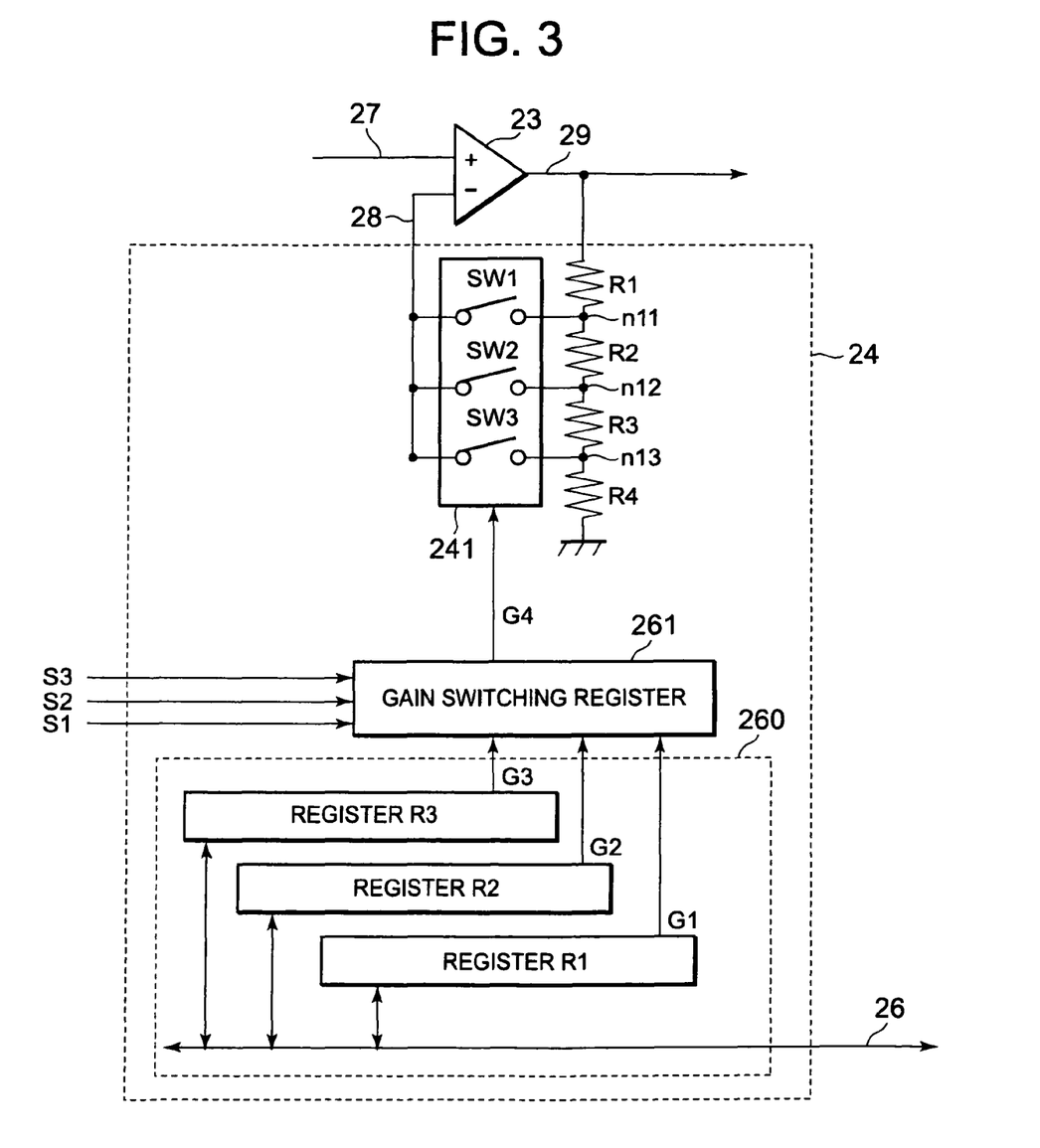
FIG. 3 is a view showing a gain control circuit of the invention.

The gain control circuit 24 includes resistance elements R1, R2, R3, and R4 serially connected between an output side of the amplifier 23 and ground (GRD), and a switch circuit 241 for connecting each input, on the inversion side, of the amplifier 23 with each connection node n11, n12, and n13 of the each resistance element.

Further, a gain setting register 260 is provided in which gain setting data are stored beforehand for switching and controlling the ON/OFF of a plurality of switches SW1, SW2, and SW3 constituting the switch circuit 241.

The gain setting register 260 includes resistors R1, R2, and R3 in which three gain setting data are stored. In addition, a gain switching register 261 is provided in which any one of outputs G1, G2, and G3 of the gain setting data stored in the respective resistors R1, R2, and R3 are latched and retained in synchronization with the gain switching signals S1, S2, and S3.

The gain switching register 261 is connected to the switch circuit 241, and each of switches of the switch circuit 241 is switched according to gain setting data to be outputted from the gain switching register 261.

The gain switching register 261 latches gain setting data stored in the resistor R1 when the gain switching signal S1 outputted from the gain switching signal generation circuit 212 is active (high level). In a similar manner, when the gain switching signal S2 is active (high level), the gain switching register 261 latches gain setting data stored in the resistor R2, and when the gain switching signal S3 is active (high level), the gain switching register 261 latches gain setting data stored in the resistor R3.

In the switch circuit 241, switches are switched as follows: when gain setting data outputted from the gain switching register 261 are data of the resistor R1, SW1 is turned ON; when the gain setting data are data of the resistor R2, SW2 is turned ON; and when the gain setting data are data of the resistor R3, SW3 is turned ON.

Figure 7:
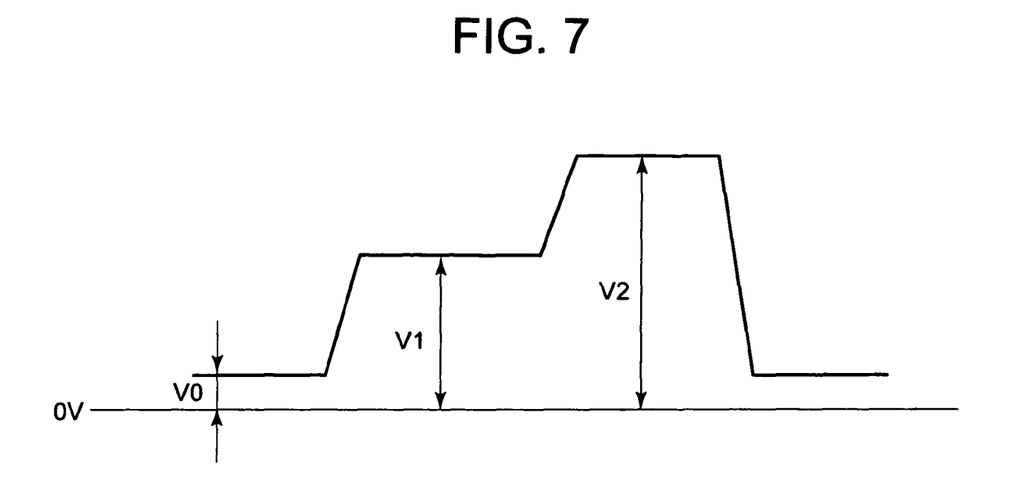
FIG. 7 is a view showing an example of an analog signal to be inputted in an amplifier of the invention.

FIG. 7 shows an example of an analog signal 27 from the inverter circuit 4, which is inputted in the amplifier 23. Detailed timing is described later. FIG. 7 shows that change of the analog signal 27 is divided roughly into three stages. FIG. 7 also shows that at each of the stages, the analog signal 27 fluctuates to a certain degree, with the respective maximum amplitudes being represented by V0, V1, V2 (V0<V1<V2) with reference to 0 V. When these voltages are inputted into the A/D converter 25 having 10-bit resolution for an amplitude from 0 V to Vref (a reference voltage of the A/D converter 25), e.g., when Vref=V2, resolution for the amplitude range V2 is 10 bits, but for the amplitude range V1, resolution is lower than 10 bits, and resolution for the amplitude range V0 is even lower.

For example, when Vref=V2=5 V, it is possible to perform an A/D conversion with 10-bit resolution for 5 V, but when V1=2.5 V, it is not possible to perform an A/D conversion with 10-bit resolution for the amplitude of 2.5 V, so that since $(2.5/5) \times 1024 = 2^9$, it is only possible to perform an A/D conversion with 9-bit resolution. When V0=0.5 V, $(0.5/5) \times 1024 = 102.4 < 2^7$ and, accordingly, so that resolution is less than 7 bits, and resolution of an A/D conversion on a signal having a small amplitude is lower than that of a signal having a large amplitude.

Therefore, it is necessary to amplify analog signals in a range not exceeding the reference voltage Vref, with a voltage which is convertible with maximum resolution of the A/D converter 25, or a voltage close thereto, using the amplifier 23, so that the analog signals correspond to the V0, V1, V2 having different signal amplitudes. At this time, since gains are different for V0, V1, and V2, it is extremely important to securely detect the change timings for respective levels and to amplify the analog signals at an adequate gain for the purpose of achieving an accurate A/D conversion.

Using a timing chart of FIG. 4, described below are a count value of the up/down counter 211, an analog signal and a PWM signal from the inverter circuit 4, a gain switching signal, and an A/D conversion trigger output. The following description is given assuming that time passes along a time axis, t, in a lateral direction (in the right direction on the drawing).

Figure 4:
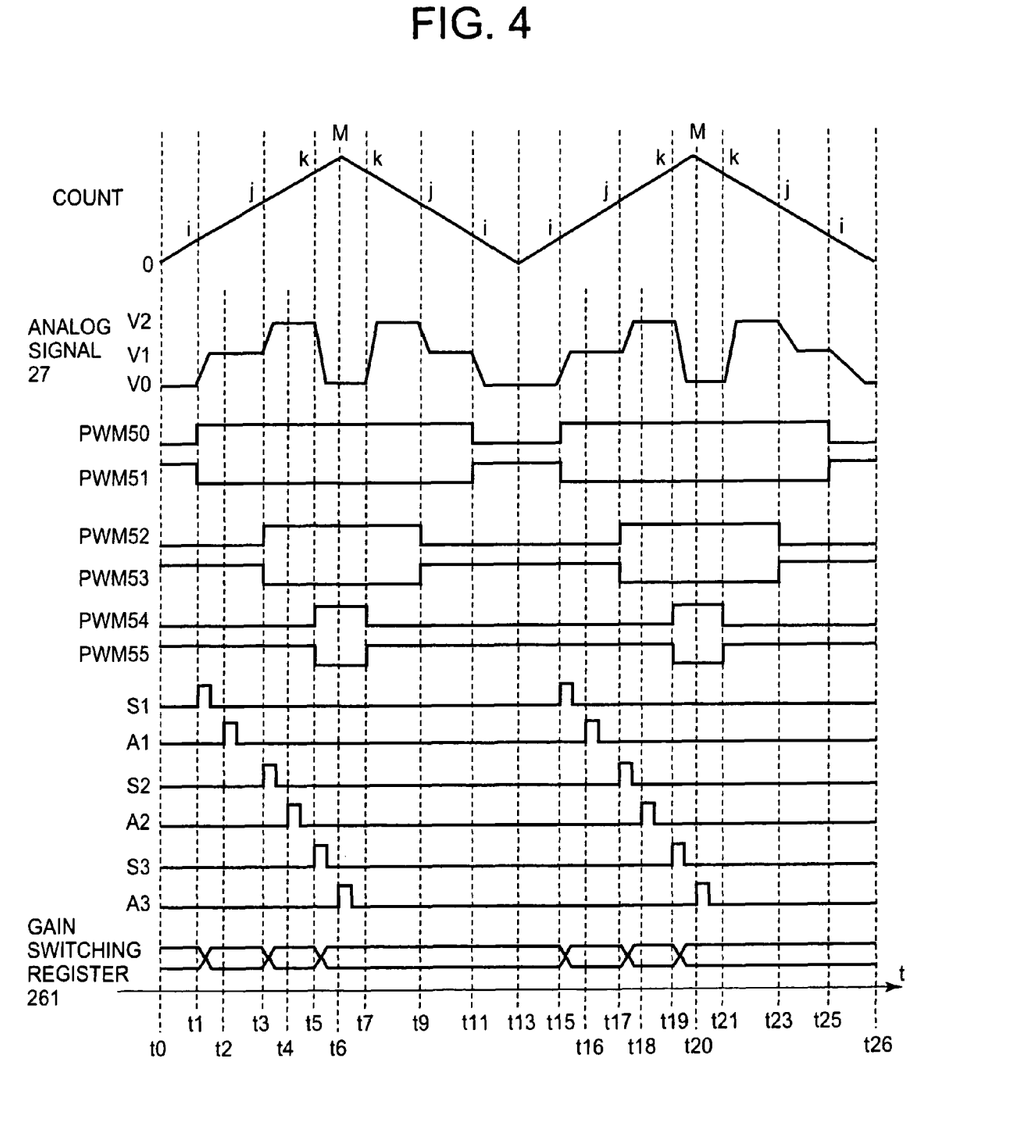
FIG. 4 is a timing chart showing a detailed operation timing of the inverter control circuit of the invention.

A count value of FIG. 4 represents that of the up/down counter 211. That is, the count value varies so that the up/down counter 211 counts up from 0 up to a maximum value M through count values i, j, and k (i, j, and k respectively representing non-negative integers in which i<j<k), and counts down to 0 through the count values k, j, and i, and newly counts up. For example, for 16-bit counter, the up/down counter 211 counts up from 0 to 65535 (decimal number), and thereafter, count down, and when the count value becomes 0, the up/down counter 211 newly counts up.

The PWM signal 50 rises from low level ('0') to high level ('1') at a timing, t1, at which a count value of the up/down counter 211 increases, starting from 0, and becomes i, and the PWM signal 50 falls at a timing, t11, at which the count value decreases and again becomes i. When the count value becomes 0, the count value again increases, but subsequently, the same operations are repeated. The PWM signal 51 is an inverted output of the PWM signal 50.

The PWM signal 52 rises from low level ('0') to high level ('1') at a timing, t3, at which a count value of the up/down counter 211 increases, starting from 0, and becomes j, and the PWM signal 52 falls at a timing, t9, at which the count value decreases and again becomes j. When the count value becomes 0, the count value again increases, but subsequently, the same operations are repeated. The PWM signal 53 is an inverted output of the PWM signal 52.

The PWM signal 54 rises from low level ('0') to high level ('1') at a timing, t5, at which a count value of the up/down counter 211 increases, starting from 0, and becomes k, and the PWM signal 54 falls at a timing, t7, at which the count value decreases and again becomes k. When the count value becomes 0, the count value again increases, but subsequently, the same operations are repeated. The PWM signal 55 is an inverted output of the PWM signal 54.

Incidentally, output control is performed at different change timings of the PWM signal 50 and the PWM signal 51 by providing a period of time, generally referred to as dead time, so that the change timings do not overlap with each other. In this embodiment, however, the timings will be described without consideration of the dead time for the sake of simplification. In the same manner, no dead time is assumed to exist for the description of the PWM signals 52 and 53 and the PWM signals 54 and 55.

With the above-described six-phase PWM signal, the switches Tr1 to Tr6 of the inverter circuit 4 are turned ON or OFF, so that the analog signal 27 into the microcomputer 2 changes as shown in FIG. 4. That is, for a period from t0 to t1, since the PWM signals 50, 52, and 54 each are at the output '0,' Tr1, Tr3, and Tr5 are all turned OFF, and consequently, an electric current does not flow in the motor coil 3, so that the node n1, i.e., the analog signal 27, is turned to the low level V0. Thereafter, for a period from t1 to t3, since the PWM signals 50, 53, and 55 each are at the output '1,' Tr1, Tr4, and Tr6 of the inverter circuit 4 are turned ON and the other Tr2, Tr3, and Tr5 are turned OFF, and consequently, an electric current flows through a switch device in an ON state and the motor coil 3, so that a voltage at the node n1 is increased from 0, and the analog signal 27 is turned to V1.

Next, for a period between t3 and t5, since the PWM signals 50, 52, and 55 are at high level, Tr1, Tr3, and Tr6 of the inverter circuit 4 are turned ON and Tr2, Tr4, and Tr5 are turned OFF, and consequently, an electric current flows through a switch device in an ON state and the motor coil 3, so that a voltage at the node n1 is increased from V2, and the analog signal 27 is turned to V3. Incidentally, low level V0 is not necessarily 0 V, but changes depending on a design condition of the inverter circuit 4. However, in this embodiment, low level V0 is so referred attributable to a relationship represented by V0<V1<V2.

For a period from t5 to t7, since outputs of the PWM signals 51, 53, and 55 are all at '0,' Tr2, Tr4, and Tr5 are all turned OFF, and consequently, an electric current does not flow in the motor coil 3, so that the node n1 is at low level, i.e., the analog signal 27, is turned to the low level V0. For a period from t7 to t9, since the PWM signals 50, 52, and 55 are at '1,' Tr1, Tr3, and Tr6 of the inverter circuit 4 each are turned to an ON state and Tr2, Tr4, and Tr5 each are turned to an OFF state, and an electric current flows through a switch device in an ON state and the motor coil 3, so that a voltage at the node n1 is again increased, and the analog signal 27 is turned to V3.

For a period from t9 to t11, since the PWM signals 50, 53, and 55 are at '1,' Tr1, Tr4, and Tr6 of the inverter circuit 4 each are turned to an ON state and Tr2, Tr3, and Tr6 each are turned to an OFF state, and an electric current flows through a switch device in an ON state and the motor coil 3, so that a voltage at the node n1 is turned to V2.

For a period from t11 to t13, since the PWM signals 50, 52, and 54 are at '0,' Tr1, Tr3, and Tr5 of the inverter circuit 4 each are turned to an OFF state, and Tr2, Tr3, and Tr6 each are turned to an OFF state, and an electric current does not flow in the motor coil 3, so that the node n1 is at low level V0, i.e., the analog signal 27 is turned to the low level V0.

For a period from t13 to t26, timings of six-phase PWM outputs are the same as those for the period from t0 to t13, and accordingly, the analog signal 27 also varies as it does for the period from t0 to t13.

Next, the gain switching signals S1, S2, and S3 which are outputted in synchronization with PWM signals are described. The gain switching signal generation circuit 212 is a circuit which inputs the PWM signals 50, 51, and 52, and generates pulse signals of one shot in synchronization with change timings thereof. These pulse signals are connected to a gain control circuit as the gain switching signals S1, S2, and S3.

In this embodiment, although outputs of the S1, S2, and S3 are normally at '0,' rise edges of respective PWM signals are detected, and pulse signals of one shot at active high level ('1') are generated. That is, when a rise edge of the PWM signal 50 is detected, a pulse signal is outputted as the gain switching signal S1; when a rise edge of the PWM signal 52 is detected, a pulse signal is outputted as the gain switching signal S2; and when a rise edge of the PWM signal 54 is detected, a pulse signal is outputted as the gain switching signal S3.

For a period from t0 to t1 in FIG. 4, the S1, S2, and S3 each are at '0.' When the PWM signal 50 rises at t1, the gain switching signal generation circuit 212 detects the rise and outputs the gain switching signal S1. When the PWM signal 52 rises at t3, the gain switching signal generation circuit 212 detects the rise and outputs the gain switching signal S2; and when the PWM signal 54 rises at t5, the gain switching signal S3 is outputted.

When the gain switching signal S1 is outputted, output data of the register R1 of the gain setting register 260 are latched in the gain switching register 261, and an output of the gain switching register 261 causes the SW2 of the switch circuit 241 to be turned ON, and causes the SW1 and SW3 thereof to be turned OFF. Accordingly, the node n12 at which an output of the amplifier 23 is divided, and an inverting-side input 232 are connected, and among three types of gains determined at the switch circuit 241, an intermediate gain ((R1+R2+R3+R4)/(R3+R4)) is set.

A change timing of the A/D converter 25 is described here. For the A/D converter 25, the PWM signal 50 changes at t1, and a voltage of the analog signal 27 of the inverter circuit 4 changes from V0 to V1, whereafter an A/D trigger signal A1 is outputted from the A/D trigger generation circuit 230 so that an output 29 of the amplifier 23 is sampled at a timing at which the voltage is stable, and can be converted from analog to digital.

The comparison value setting registers 231 of the A/D trigger generation circuit 230 is set so that a value thereof matches with a count value of the up/down counter 211 at timing t2 which is approximately in the middle of, for example, the period between t1 and t3. The reason why the above setting is made is that since a voltage fluctuates immediately after the voltage is changed from V0 to V1, a stable voltage is measured which voltage comes after the period of the fluctuation of the voltage. When detecting a match between an output 215 being a count value of the up/down counter 211 and a value of the comparison value setting registers 231, the comparison circuit 234 outputs the A/D trigger signal A1 which is a pulse signal of one shot. The A/D converter 25 samples the output voltage 29 of the amplifier 23 based on the pulse of the A/D trigger signal A1, and converts the output voltage 29 from analog to digital.

Next, when the PWM signal 52 rises from '0' to '1' at t3, a pulse signal is outputted from the gain switching signal generation circuit 212 to the gain control circuit 24, as the gain switching signal S2. The gain switching register 261 of the gain control circuit 24 latches data of the register R2 in response to the gain switching signal S2, and consequently, SW1 of the switch circuit 241 is turned ON, and SW2 and SW3 are switched to OFF. Accordingly, a gain of the amplifier 23 is determined based on a voltage of the node n11. Among three types of gains, a minimum gain ((R1+R2+R3+R4)/(R2+R3+R4)) determined at the switch circuit 241 is set.

The analog signal 27 from the inverter circuit 4 is amplified by the amplifier 23 and inputted into the A/D converter 25. The PWM signal 52 changes at t3, a voltage of the analog signal 27 from the inverter circuit 4 changes from V1 to V2, and thereafter, the voltage is stabilized, a timing at which the A/D converter 25 samples the output 29 of the amplifier 23, and an A/D trigger signal A2 from the A/D trigger generation circuit 230 is outputted so that an A/D conversion can be performed.

The comparison value setting registers 231 of the A/D trigger generation circuit 230 is set so that a value thereof matches with a count value of the up/down counter 211 at timing t4 which is approximately in the middle of, for example, the period between t3 and t5. The reason why the above setting is made is that since a voltage fluctuates immediately after the voltage is changed from V1 to V2, a stable voltage is measured which voltage comes after the period of the fluctuation of the voltage. When detecting a match between a count value of the up/down counter 211 and a value of the comparison value setting registers 232, the comparison circuit 235 outputs the A/D trigger signal A2 which is a pulse signal of one shot. The A/D converter 25 samples an output voltage of the amplifier 23 based on the pulse of the A/D trigger signal A2, and converts the output voltage from analog to digital.

Next, when the PWM signal 54 rises from '0' to '1' at t5, a pulse signal is outputted from the gain switching signal generation circuit 212 to the gain control circuit 24, as the gain switching signal S3. The gain switching register 261 of the gain control circuit 24 latches data of the register R3 in response to the gain switching signal S3, and consequently, SW3 of the switch circuit 241 is turned ON, and SW1 and SW2 are switched to OFF. Accordingly, a gain of the amplifier 23 is determined based on a voltage of the node n13. Among three types of gains, a minimum gain ((R1+R2+R3+R4)/R4) determined at the switch circuit 241 is set.

The analog signal 27 from the inverter circuit 4 is amplified by the amplifier 23 and inputted into the A/D converter 25. The PWM signal 54 changes at t5, a voltage of the analog signal 27 from the inverter circuit 4 changes from V2 to V0, and thereafter, the voltage is stabilized, a timing at which the A/D converter 25 samples an output of the amplifier 23, and an A/D trigger signal A3 is outputted from the A/D trigger generation circuit 230 so that an A/D conversion can be performed.

The comparison value setting registers 233 of the A/D trigger generation circuit 230 is set so that a value thereof matches with a count value of the up/down counter 211 at timing t6 which is approximately in the middle of, for example, the period between t5 and t7. The reason why the above setting is made is that since a voltage fluctuates immediately after the voltage is changed from V2 to V0, a stable voltage is measured which voltage comes after the period of the fluctuation of the voltage.

When detecting a match between a count value of the up/down counter 211 and a value of the comparison value setting registers 233, the comparison circuit 236 outputs the A/D trigger signal A3 which is a pulse signal of one shot. The A/D converter 25 samples an output voltage of the amplifier 23 based on the pulse of the A/D trigger signal A3, and converts the output voltage from analog to digital. Accordingly, even when the amplitude of the voltage V0 of the analog signal 27 is small, it is possible to convert it into sufficiently accurate digital data in resolution (10 bits) of the A/D converter 25. For example, even when V0 is in a range of amplitude of 0 V to 0.5 V, when a gain is 10, an output of the amplifier 23 becomes 5 V for an input of 0.5 V, so that when the reference voltage Vref of the A/D converter 25 in 10-bit resolution is 5 V, an A/D conversion result in 10-bit resolution is acquired.

Operations described above are also applicable to those for a period from t13 to t26, when the PWM signals change in the same manner.

Digital data, at each timing, converted by the A/D converter 25 are read by CPU 21 via the bus 26. The CPU 21 performs predetermined calculation processing based on the digital data, and calculates a load of the motor at time of an A/D conversion process. At that time, based on gains determined depending on data set in the resistors R1 to R3 and based on measured A/D conversion result, a voltage of the analog signal 27 actually inputted from the inverter circuit 4 is determined.

To perform a rotation control (a feedback control) depending on a load of the motor, the CPU 21 changes pulse widths of the PWM signals 50 to 55 for controlling the inverter circuit 4. To be more specific, pulse widths are adjusted by rewriting comparison values for pulse width setting in the PWM timers 221, 222, and 223. For example, as show in FIG. 4, the adjusting is made by writing data for increasing/decreasing the period from t1 to t11 during which the pulse width of the PWM signal 50 is '1.' Also for the PWM signals 52 and 54, the pulse widths can be adjusted by rewriting in the same manner. To set pulse widths and A/D conversion timings corresponding thereto, setting values of the comparison value setting registers 231, 232, and 233 of the A/D trigger generation circuit are rewritten.

As described above, in a control of the inverter circuit 4 of Embodiment 1 of the invention, a gain of the analog signal 27 outputted from the inverter circuit 4 is switched in synchronization with change timings of the PWM signals 50, 52, and 54 outputted from the timer circuit 22. Thereby, the voltage of the analog signal 27 is amplified with an appropriate gain in accordance with a changed level of a voltage of the analog signal 27, and then is converted from analog to digital by the A/D converter 25. That is, since a timing at which the gain is changed can be securely figured out without depending on the operation of the CPU in performing other processing, the digital data converted and acquired in predetermined resolution by the A/D converter 25 can be processed as highly accurate data, irrespective of the amplitude of the analog signal 27.

(Embodiment 2)

In Embodiment 1 of the invention, on the measurement of the analog signal 27 from the inverter circuit 4, during one period (the period from t0 to t13) in which the up/down counter 211 counts up from 0 to the maximum value M and, thereafter, counts down from M to 0, V0, V1, and V2 are measured only while counting up. However, described below is an example in which the voltage of the analog signal 27 is measured during both the count-up period and the count-down period in the one period. Thus, it becomes possible to measure a change of the voltage level with a higher degree of accuracy than that in Embodiment 1 of the invention, so that a feedback control can be performed.

In Embodiment 2 of the invention, the gain switching signals S1, S2, and S3 described in Embodiment 1 are respectively outputted twice in the one period of the up/down counter 211. Further, the A/D trigger signals A1, A2, and A3 of the A/D converter 25 are similarly outputted twice in the one period, and based on the A/D trigger signals occurring six times in total, an A/D conversion is performed. In other words, in Embodiment 1, the gain switching signals S1, S2, and S3 and the A/D trigger signals A1, A2, and A3 are outputted only during the count-up period of the up/down counter 211, but in Embodiment 2, these signals are respectively during both the count-up period and the count-down period.

Figure 5:
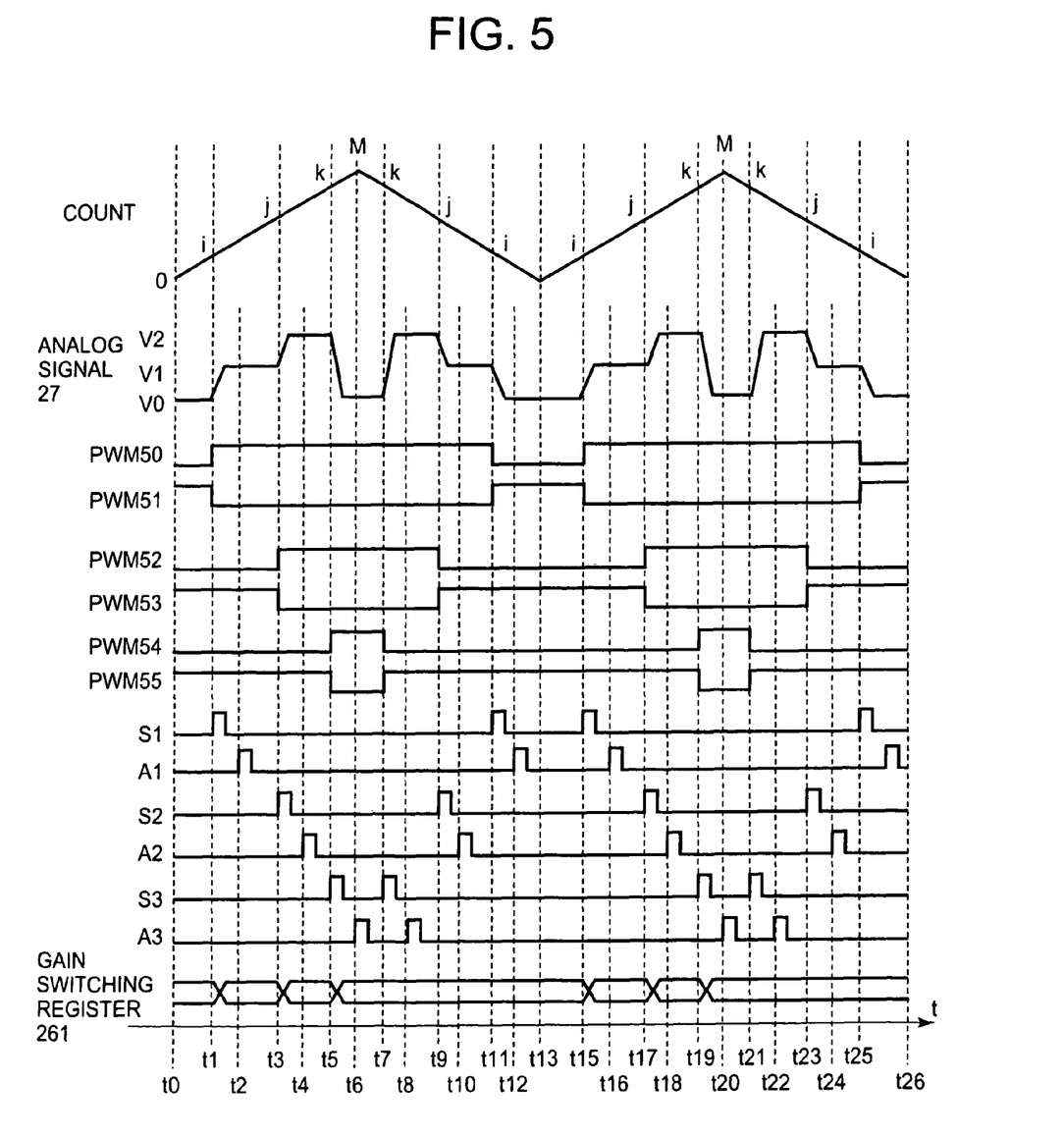
FIG. 5 is a timing chart showing detailed operation timing of an inverter control circuit of a second embodiment of the invention.

More specifically, timings are shown in FIG. 5 at which the gain switching signals S1, S2, and S3 and the A/D trigger signals A1, A2, and A3 are outputted. A further description of the signals outputted at the same timings as those of FIG. 4 is omitted.

In Embodiment 1 of the invention, the example has been described in which in synchronization with each change timing, i.e., rise timings to be more precise, of the PWM signals 50, 52, and 54, the gain switching signals S1, S2, and S3 are outputted from the gain switching signal generation circuit 212, but in Embodiment 2, the gain switching signals S1, S2, and S3 are outputted from the gain switching signal generation circuit 212 at both the rise and fall timings.

To be more specific, the PWM signal 54 rises at t5 and the gain switching signal S3 is outputted, whereafter the gain switching signal S3 is newly outputted in synchronization with the falling of the PWM signal 54 at t7. Thereafter, the gain switching signal S2 is outputted in synchronization with the falling of the PWM signal 52 at t9, and the gain switching signal S1 is outputted in synchronization with the falling of the PWM signal 50 at t11. Respective switch states of the switch circuit 241 of the gain control circuit 24 to be switched in response to outputs of the gain switching signals S1, S2, and S3 are the same as those of Embodiment 1.

Accordingly, the gain of the amplifier 23 is switched as in Embodiment 1. Meanwhile, from the comparison circuits 234, 235, and 236 of the A/D trigger generation circuit 230, the A/D trigger signals A1, A2, and A3 are outputted when count values and contents of respective comparison setting registers match, during both the count-up period and the count-down period of the up/down counter 211. Therefore, as in the count-up period, A/D conversion processing is performed on V0, V1, and V2 during the count-down period.

Based on A/D conversion results acquired during both the count-up period and the count-down period of the up/down counter 211, the CPU 21 is capable of adjusting the pulse widths of the PWM signals outputted from the timer circuit 22. Therefore, even when values of V0, V1, and V2 fluctuate during the count-up period and the count-down period of the up/down counter 211, it becomes possible to accurately determine the analog signal 27.

(Embodiment 3)

Figure 6:
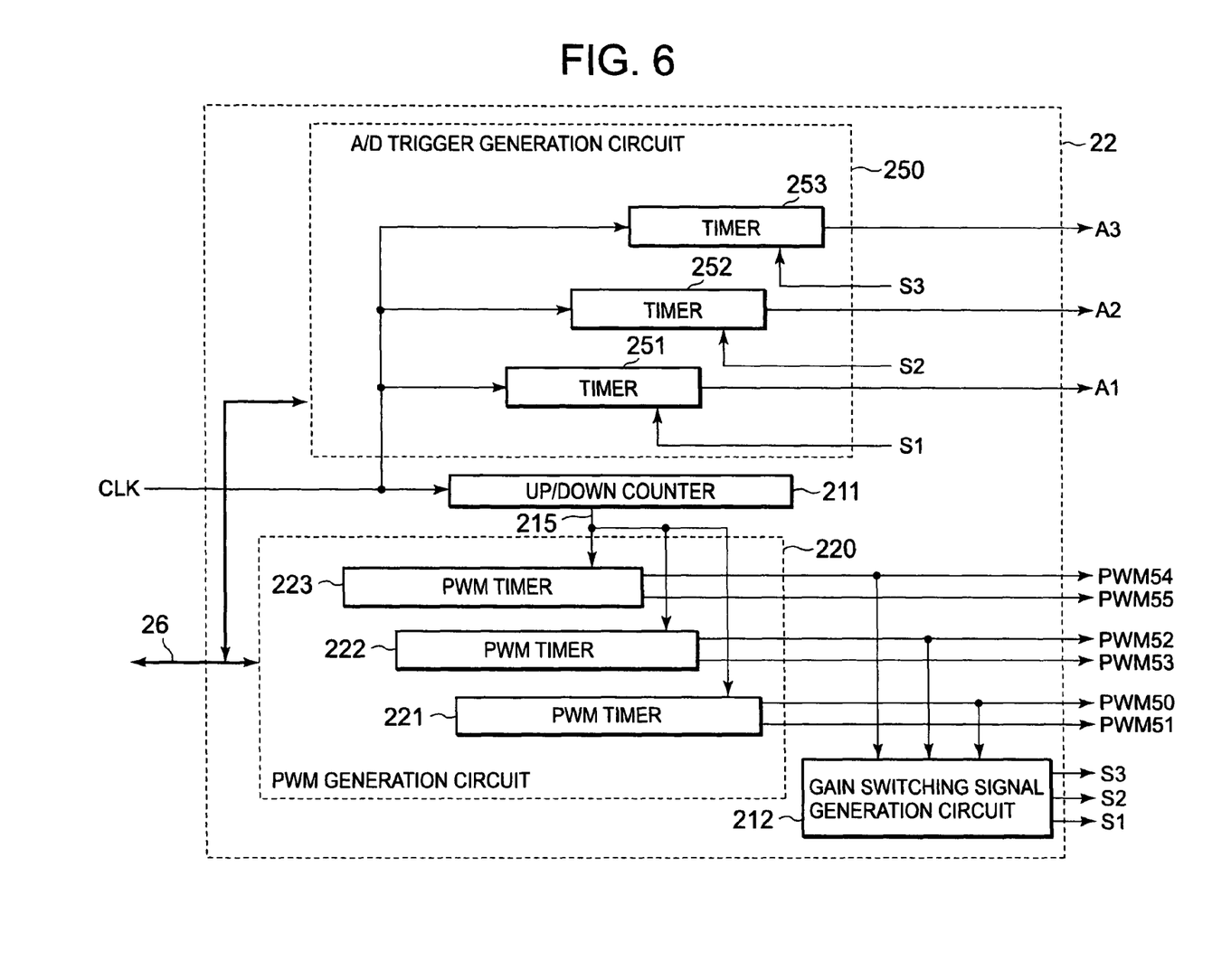
FIG. 6 is a view showing a timer circuit of a third embodiment of the invention.

An A/D trigger generation circuit 250 is shown as another configuration example different from that of the A/D trigger generation circuit 230 in Embodiments 1 and 2 of the invention. Other configurations than that of the A/D trigger generation circuit 250 are the same as those of Embodiment 1. The timers 251, 252, and 253 each include a counter which counts up in response to a clock CLK inputted therein, a comparison value register, and a comparison circuit which compares the counter and the comparison value register, in which comparison value register a predetermined value is set through a bus 27 by the CPU 21, and generates a pulse signal when the set value and a count value match (the counter, the comparison value register, and the comparison circuit in each timer are not shown).

Connected to a gain switching signal S1, and once the counter in the timer 251 is cleared in response to the pulse input of S1, the timer 251 counts up from 0; and when the comparison circuit detects the match, an A/D trigger signal A1 is outputted. That is, after a predetermined period of time elapses since the inputting of the gain switching signal S1, an A/D conversion operation is enabled.

Similarly, connected to a gain switching signal S2, and once the counter in the timer 252 is cleared in response to the pulse inputting of S2, the timer 252 counts up from 0; and when the comparison circuit detects the match, an A/D trigger signal A2 is outputted. Connected to a gain switching signal S3, and once the counter in the timer 253 is cleared in response to the pulse inputting of S3, the timer 253 counts up from 0; and when the comparison circuit detects the match, an A/D trigger signal A3 is outputted.

As described above, in Embodiment 3, since a measurement is made after a predetermined period of time elapses subsequent to the inputting of a gain switching signal, it becomes easier to set a timing of the A/D conversion.

In the above-described embodiments, the example has been described in which in synchronization with change timings (rise timings) of the PWM signals 50, 52, and 54, a gain of the analog signal 27 outputted from the inverter circuit 4 is switched. However, alternatively, a gain of the analog signal 27 outputted from the inverter circuit 4 may be switched in synchronization with change timings (fall timings) of the PWM signals 51, 53, and 55 which are inversions of the above respective PWM signals.

In the case where between rise/fall timings of the PWM signals 50, 52, and 54 and rise/fall timings of the PWM signals 51, 53, and 55, which are inversions of the above respective PWM signals, a period of time referred to as dead time is provided so that there is no overlapping on a change point, it is determined whether to generate a gain switching signal in response to the PWM signals 50, 52, and 54 or to generate a gain switching signal in response to the PWM signals 51, 53, and 55, depending on the configurations of switches of the inverter circuit 4 and on switching timings. Further, although the switch devices Tr1 to Tr6 of the inverter circuit have been described as NPN transistors, the switch devices are not limited to the NPN transistors. They may take configurations using PNP transistors or MOSFETs (metal-oxide-semiconductor field-effect transistors), or the like. For configurations, an active level of a PWM signal for controlling a switch device depending on each configuration, and a PWM signal inputted into the gain switching signal generation circuit 212 corresponding to the active level may be determined.

In addition, although timings of voltage measurements of V0, V1, and V2 of the analog signal 27 from the inverter circuit 4 have been described as A1, A2, and A3, analog signals are sampled at each time at each of the timings i.e., a plurality of number of times, so that A/D conversions may be performed. In that case, averaging is made based on a plurality of pieces of conversion data, so that more accurate voltage value can be measured.

Further, by increasing the number of resistance devices R1 to R4 of the gain control circuit 24 and the number of switches of the switch circuit 241, the number of setting types of gain switching may be increased. Resistance values of the resistance devices R1 to R4 may be set depending on a gain of an object.

It is to be understood that the present invention is not intended to be limited to the above-described embodiments, and various changes may be made therein without departing from the spirit of the present invention.

What is claimed is:

1. An inverter control circuit, controlling an inverter circuit including a switch device, the inverter control circuit comprising:
    a timer circuit configured to generate a PWM signal for controlling an electric conductive state of the switch device;
    an amplifier configured to receive, amplify, and output an analog signal generated with a load electric current of the inverter circuit; and
    a gain control circuit configured to control switching of a gain of the amplifier in synchronization with an output change timing of the PWM signal,
    an A/D converter, wherein
    an output of the amplifier is converted into digital data,
    a pulse width of the PWM signal is adjusted based on the digital data,
    wherein the gain control circuit controls the gain of the amplifier so that a plurality of voltage levels of the analog signal are amplified in a range not exceeding a reference voltage of the A/D converter,
    wherein the timer circuit includes an A/D trigger signal generation circuit which outputs an A/D trigger signal indicative of a conversion start timing of the A/D converter so that the analog signal amplified after the switching of the gain of the amplifier is converted from analog to digital.

2. The inverter control circuit according to claim 1, wherein the gain control circuit controls switching of the gain of the amplifier in synchronization with any of a timing of changing an output of the PWM signal from a low level to a high level and a timing of changing an output of the PWM signal from the high level to the low level.

3. The inverter control circuit according to claim 1, wherein
    the timer circuit includes an up/down counter which performs a count-up operation and a count-down operation based on a clock input, and
    the output change timing of the PWM signal is determined based on a count value of the up/down counter.

4. The inverter control circuit according to claim 1, further comprising a gain switching signal generation circuit which detects an output change timing of the PWM signal, and outputs a pulse signal of one shot to the amplifier as a gain switching signal.

5. The inverter control circuit according to claim 1, wherein the A/D trigger signal generation circuit includes:
    a comparison value setting register which sets a setting value to be compared with the count value of the up/down counter performing the count-up operation and the down-count operation based on the clock input; and
    a comparison circuit which compares the count value and contents of the comparison value setting register, wherein
    the A/D trigger signal generation circuit outputs the A/D trigger signal based on a comparison result of the comparison circuit.

6. The inverter control circuit according to claim 1, wherein after receiving the PWM signal and detecting an output change timing of the PWM signal, the A/D trigger signal generation circuit measures a predetermined period of time and thereafter outputs the A/D trigger signal.

7. The inverter control circuit according to claim 1, further comprising a CPU which performs calculation processing based on the digital data, and adjusts the pulse width of the PWM signal.

8. The inverter control circuit according to claim 7, wherein the PWM signal includes a plurality of PWM signals of positive phase and a plurality of PWM signals of inverted phase corresponding to controls of the U-phase, the V-phase, and the W-phase in the control of the three-phase motor, the switch devices of the inverter circuit includes a plurality of switch devices which controls the three-phase motor, and the gain control circuit controls the switching of the gain of the amplifier in synchronization with a change of an output timing of the plurality of PWM signals of positive phase or with a change of an output timing of the plurality of PWM signals of inverted phase.

9. The inverter control circuit according to claim 1 wherein at least three different levels are used as the plurality of voltage levels, the three different levels respectively corresponding to a U-phase, a V-phase, and a W-phase of a three-phase motor, and the switching of the gain of the amplifier is controlled depending on each of the voltage levels.

10. An inverter control circuit controlling an inverter circuit including a switch device, the inverter control circuit comprising:

a timer circuit configured to generate a PWM signal for controlling an electric conductive state of the switch device;

an amplifier configured to receive, amplify, and output an analog signal generated with a load electric current of the inverter circuit; and a gain control circuit configured to control switching of a gain of the amplifier in synchronization with an output change timing of the PWM signal, an A/D converter, wherein an output of the amplifier is converted into digital data, a pulse width of the PWM signal is adjusted based on the digital data, wherein the gain control circuit controls the gain of the amplifier so that a plurality of voltage levels of the analog signal are amplified in a range not exceeding a reference voltage of the A/D converter, wherein the amplifier includes a first input and a second input, the analog signal is connected to the first input, the output of the amplifier is connected to the A/D converter, a plurality of resistance devices are serially connected between the output of the amplifier and ground;

a switch circuit is connected between the second input and a plurality of connection nodes placed between the plurality of resistance devices, and the gain control circuit controls the switching of the gain based on gain setting data for setting the switch circuit to an ON state and an OFF state.

11. The inverter control circuit according to claim 10, wherein the gain control circuit includes:

a gain setting register which stores the gain setting data before an output change of the PWM signal; and a switch switching register which latches the gain setting data stored in the gain setting register in response to a gain switching signal synchronous with an output change timing of the PWM signal, supplies the gain setting data to the switch circuit, and retains the latched gain setting data until receiving the gain switching signal.

12. The inverter control circuit according to claim 11, wherein the gain setting register includes a plurality of registers in which different gain setting data corresponding to the plurality of voltage levels are stored.

13. An inverter control circuit controlling an inverter circuit including a switch device, the inverter control circuit comprising:

a timer circuit configured to generate a PWM signal for controlling an electric conductive state of the switch device;

an amplifier configured to receive, amplify, and output an analog signal generated with a load electric current of the inverter circuit; and a gain control circuit configured to control switching of a gain of the amplifier in synchronization with an output change timing of the PWM signal, an A/D converter, wherein an output of the amplifier is converted into digital data, a pulse width of the PWM signal is adjusted based on the digital data, wherein the gain control circuit controls the gain of the amplifier so that a plurality of voltage levels of the analog signal are amplified in a range not exceeding a reference voltage of the A/D converter, wherein at least three different levels are used as the plurality of voltage levels, the three different levels respectively corresponding to a U-phase, a V-phase, and a W-phase of a three-phase motor, and the switching of the gain of the amplifier is controlled depending on each of the voltage levels.

* * * * *